US010301079B2

United States Patent
Saraf

(10) Patent No.: US 10,301,079 B2
(45) Date of Patent: May 28, 2019

(54) HYBRID PLUG AND METHOD OF SEALING A DRUM

(71) Applicant: Sudarshan Madoprasad Saraf, Mumbai (IN)

(72) Inventor: Sudarshan Madoprasad Saraf, Mumbai (IN)

( * ) Notice: Subject to any disclaimer, the term of this patent is extended or adjusted under 35 U.S.C. 154(b) by 178 days.

(21) Appl. No.: 15/508,783

(22) PCT Filed: Mar. 27, 2015

(86) PCT No.: PCT/IN2015/000150
§ 371 (c)(1),
(2) Date: Mar. 3, 2017

(87) PCT Pub. No.: WO2016/035092
PCT Pub. Date: Mar. 10, 2016

(65) Prior Publication Data
US 2017/0247150 A1  Aug. 31, 2017

(30) Foreign Application Priority Data

Sep. 3, 2014  (IN) .......................... 2812MUM/2014

(51) Int. Cl.
*B65D 39/08* (2006.01)
*B65D 41/32* (2006.01)
(Continued)

(52) U.S. Cl.
CPC ........... *B65D 41/325* (2013.01); *B65D 39/08* (2013.01); *B65D 43/0281* (2013.01);
(Continued)

(58) Field of Classification Search
CPC .. B65D 39/08; B65D 39/084; B65D 55/0845; B65D 51/18; B65D 43/0281
(Continued)

(56) References Cited

U.S. PATENT DOCUMENTS 2,798,742 A   7/1963   Zampella et al.
3,122,261 A   2/1964   Parish, Jr. et al.
(Continued)

FOREIGN PATENT DOCUMENTS

WO   WO-03070586 A1 *  8/2003  ........... B65D 39/084

OTHER PUBLICATIONS

PCT Written Opinion of the International Searching Authority for Application PCT/IN2015/000150; filing date Mar. 27, 2015; Saraf, Sudarshan Madoprasad; dated Sep. 3, 2016; 4 pages.

*Primary Examiner* — Anthony D Stashick
*Assistant Examiner* — Mollie Impink
(74) *Attorney, Agent, or Firm* — Thorpe North & Western, LLP

(57) ABSTRACT

The hybrid plug is a single component replacement for three components, the paint plug, conventional plug and capseal in a drum closure. It is formed from a single sheet of metal and has a plug portion and a capseal portion which vary in thickness. The plug portion has a collar and an externally threaded wall with a plug gasket disposed on a plug gasket seat. The capseal portion is provided with ears and scoring to enable separation from the plug portion and with a lining on the inner wall of the capseal portion to safeguard against plug gasket failure. The capseal portion may be recessed at intervals to form dimples which hold the hybrid plug in place in an automated insertion process. The hybrid plug provides a passage for air and gases during paint curing and leak testing without necessitating removal.

11 Claims, 6 Drawing Sheets

(51) Int. Cl.

| | |
|---|---|
| *B65D 55/08* | (2006.01) |
| *B65D 43/02* | (2006.01) |
| *F16J 15/3252* | (2016.01) |
| *F16J 15/3268* | (2016.01) |
| *B65D 59/02* | (2006.01) |
| *B65D 41/00* | (2006.01) |
| *B65D 41/34* | (2006.01) |

(52) U.S. Cl.
CPC ......... *B65D 55/0845* (2013.01); *B65D 59/02* (2013.01); *F16J 15/3252* (2013.01); *F16J 15/3268* (2013.01); *B65D 41/00* (2013.01); *B65D 41/32* (2013.01); *B65D 41/34* (2013.01); *B65D 41/3423* (2013.01); *B65D 41/3438* (2013.01)

(58) Field of Classification Search
USPC ............... 220/259.4, 257.2, 276, 288, 257.1; 215/256
See application file for complete search history.

(56) References Cited

U.S. PATENT DOCUMENTS

| | | | | |
|---|---|---|---|---|
| 4,785,963 | A | * | 11/1988 | Magley ................ B65D 39/088 215/252 |
| 5,075,951 | A | | 12/1991 | Schurr et al. |
| 5,348,182 | A | * | 9/1994 | Luch ...................... B29C 57/12 215/253 |
| 6,726,048 | B2 | | 4/2004 | Dwinell et al. |
| 72,879,622 | | | 10/2007 | Van De Klippe et al. |

* cited by examiner

HYBRID PLUG AND METHOD OF SEALING A DRUM

FIELD OF THE INVENTION

The invention is directed to an improvement in drum closures and more specifically directed to a hybrid plug wherein the capseal and the plug are integrated to form a single component and to a method of sealing a drum using the hybrid plug.

BACKGROUND OF THE INVENTION

Conventional drum closure systems require a plug to close the drum openings during drum painting. This is to prevent the paint from contaminating the inside of the drum. Generally, drum openings are of two sizes, 20 mm and 50 mm. Therefore, flanges and plugs also generally come in 20 mm and 50 mm sizes. Conventional plugs are generally of 1.0 to 1.2 mm thickness and capseals are generally of 0.3 mm thickness. The conventional plug cannot be fully torqued into the flange threads before painting because at the time of paint curing which happens typically at 180 degrees centigrade, the hot air inside the drum needs to be vented, failing which pressure builds up inside the drum. This can lead to deformation of the drum. Therefore, conventional plugs need to be partially screwed into the flange to provide an outlet for the hot air during paint curing. However, the disadvantage of screwing the conventional plug partially into the flange is that paint spray shall fall on plug gasket and some part of flange thread chamfer which is unacceptable to drum customers who fill critical chemicals.

For this reason, flange openings of the drum in conventional systems are more often than not closed with a paint plug just before the paint operation. The function of the paint plug is to cover the flange opening to prevent paint ingress inside the drum and on the flange inner wall. At the same time, the paint plug allows the escape of hot air from the drum during paint curing, preventing pressure build-up inside the drum. The disadvantage of using a paint plug besides the cost of material is that the process of insertion of the paint plug at present is generally a manual operation.

The paint plug typically is taken off after paint curing either manually or by a magnetic conveyor running overhead. However, often the magnetic conveyor fails to take off the paint plug. Therefore, another disadvantage of using the paint plug is that removal cannot be fully automated and requires manual supervision.

A paint plug can be re-used a number of times before a thick layer of paint builds up on it. For environmental reasons, the paint plug has to be stripped of paint before putting it back to use or discarding it after a number of uses. Stripping of the paint plug also involves additional costs for the drum manufacturer. Further, paint stripping needs to meet strict environment standards, for which costs are higher.

To save on the cost of painting stripping, some drum manufacturers with lower quality requirements may avoid the use of a paint plug and instead directly insert a conventional plug loosely into the flange opening to allow for the passage of hot air from inside the drum during paint curing. This does not prevent some paint from coming in contact with the plug gaskets and the flange inner wall during paint spraying. Therefore, when drum manufacturers save on the cost of the paint plug, it results in a compromise on quality.

The conventional plug insertion is not generally automated and has to be done manually. Auto insertion of plugs is easier when insertion is done on the drum head immediately after flanges are inserted as compared to insertion of plug after the drum head is assembled with the drum body. When the insertion in on the drum head prior to drum assembly, the drum head is automatically handled, angular position of the drum head opening is known and alignments needed to correctly find the threads are easy to obtain as the drum head is still a flat sheet. However due to the need for maintaining a passage for air to escape during paint cure, conventional plugs cannot be torqued. Paint plugs generally do not even have threads to torque and a loose plug would get dislodged in drum assembly. Therefore conventional plug or paint plug insertion before drum painting has not generally been automated in industry.

Paint curing is followed by the leak detection process which may be carried out generally by helium injection into the drum. Nitrogen is generally injected for corrosion control in the drum interior. The paint plug is taken off after paint curing to be replaced with a conventional plug after nitrogen and helium injection.

Where conventional plugs have been used instead of paint plugs before the paint operation, generally the larger 50 mm plug is removed to inject nitrogen and helium and then both 20 mm and 50 mm plugs are torqued in and the openings sealed. Thereafter, the drum goes through a helium tester to detect leaks after which it can be shipped to the customer After leak testing the drum is sent for filling which is generally carried out by unscrewing the 50 mm plug, filling the drum and re-torqueing the plug. A capseal is fed over both the 20 mm and 50 mm plugs. Before shipping to the customer, the capseals are crimped. The role of the capseal is to make the drum tamperproof. The capseal is so designed that it needs to be destroyed in order to detach it. Separate equipment is required to feed and crimp the capseals. The hybrid plug has been designed to be used in conventional drum closure system as a replacement of the conventional plug, paint plug and capseal and offers many advantages as described below.

OBJECTS OF THE INVENTION

1. The main object of this invention is to provide a single component replacement made from a single metal sheet for three components, a conventional plug, paint plug and capseal.
2. It is another object of this invention is to avoid the use of a separate capseal. Use of the hybrid plug helps avoid the extra maintenance of equipment required to crimp the capseal after feeding it correctly over drum closure openings. Use of a hybrid plug also saves the additional expenditure of purchase of the capseal and the effort of inventorying it.
3. It is yet another object of this invention to eliminate the use of paint plugs which need to be stripped of paint before disposal thereby reducing wasteful expenditure for drum makers. Paint stripping costs are not low as the process has to meet strict environment standards.
4. Another object of this invention is to eliminate the manual insertion of paint plugs just before paint booth entry. The hybrid plug can be machine inserted. Use of the hybrid plug also eliminates the manual supervision of the removal of paint plugs before the leak detection process.
5. It is another object of this invention to overcome operational difficulties faced when conventional plugs are used instead of paint plugs prior to paint booth entry. Conventional plugs have to be inserted loosely into the flange opening before paint booth entry thus making the operation generally manual. Hybrid plugs can be auto-inserted. The use of conventional plugs in the place of paint plugs does not completely prevent paint coming in contact with the plug gasket and, inner wall of flange thus leading to a compromise on quality. This can be avoided with the use of a hybrid plug.

6. It is yet another object of this invention to provide a hybrid plug that can be held in place without gasket contact thereby overcoming the disadvantage of the conventional plug coming unscrewed when torqued partially into the flange. This feature of the hybrid plug helps in automating insertion because the plug can be inserted into the flange in the drum head itself while it is being transported in an automatic line after flange insertion.

7. It is an object of this invention to provide a hybrid plug which is safer from the point of view of torque retention, being one-piece and double locked.

8. It is another object of this invention to obtain different thickness of material in different parts of a single hybrid plug.

9. It is yet another object of this invention to enable automated hybrid plug insertion, torqueing and crimping and use a single combination tool for torqueing and crimping the hybrid plug.

10. Another object of invention is to be able to easily automate injection of nitrogen and helium and also facilitate auto plug insertion after paint cure as the hybrid plug shall come out of drum painting with threads engaged. In the automatic plug insertion machines presently used after paint cure in few drum plants in the world, the largest problem is of thread finding in order to screw a fresh plug in. This is because the drum is a fabricated voluminous container, prone to some changes in form during paint cure. This poses a challenge for trouble-free thread finding in a machine in a high speed assembly line. The hybrid plug eliminates thread finding since the threads shall be pre-engaged. This will enable a large number of drum makers around the world to automate plug insertion and save on expensive labour and equipment.

STATEMENT OF THE INVENTION

Accordingly to achieve the above mentioned objects, the present invention provides:

A hybrid plug formed from a single sheet of metal, comprising a plug portion having a base, a cylindrical sidewall having an external threaded portion and a gasket seat, an annular collar extending radially outwardly from said cylindrical sidewall and an annular plug gasket disposed on the gasket seat against the undersurface of said collar; a capseal portion having an annular cap extending radially from the rim of said collar and an annular skirt extending downwardly from said cap, concentric to said cylindrical sidewall, the thickness of the capseal portion being less than the thickness of the collar; plurality of ears disposed along the rim of said skirt; scoring for easy tearing away of the capseal portion; and one or more lugs fastened to the base to enable torqueing of the plug.

The present invention also provides a method of sealing a drum installed with a threaded flange having a curled lip, comprising the steps of inserting a hybrid plug into the flange threads before drum painting and partially screwing said hybrid plug forward so that the plug gasket does not make contact with the flange inner wall, thereby defining a first aperture between the plug gasket and the flange inner wall, the capseal skirt covering the flange inner wall and plug gasket to prevent contamination during drum painting, the hybrid plug positioned to define a second aperture between the capseal skirt and the curled lip of the flange, said apertures providing an inlet and outlet for air and gases; screwing forward the hybrid plug completely into the flange threads when the drum has to be securely sealed, so that the plug gasket wedges against the inside of the flange curled lip; sealing said drum after it has been filled by torqueing and crimping the hybrid plug so that the lining wedges against the top of the flange curled lip; gripping the first pair of ears and ripping said ears along the scoring lines up to the annular scoring for partial removal of the capseal portion of the hybrid plug; gripping the second pair of ears and tearing the capseal portion off from the annular scoring to completely separate the capseal portion from the plug portion; and unscrewing the plug portion with the help of one or more lugs to access contents of the drum.

SUMMARY OF THE INVENTION

The hybrid plug is a single component replacement for three components, the paint plug, conventional plug and capseal in a drum closure. It is formed from a single sheet of metal and has a plug portion and a capseal portion which vary in thickness. The plug portion has a collar and an externally threaded wall with a plug gasket disposed on a plug gasket seat. The capseal portion is provided with ears and scoring to enable separation from the plug portion and with a lining on the inner wall of the capseal portion to safeguard against plug gasket failure. The capseal portion may be recessed at intervals to form dimples which hold the hybrid plug in place in an automated insertion process. The hybrid plug provides a passage for air and gases during paint curing and leak testing without necessitating removal.

DETAILED DESCRIPTION OF THE DRAWINGS

Figure 1:
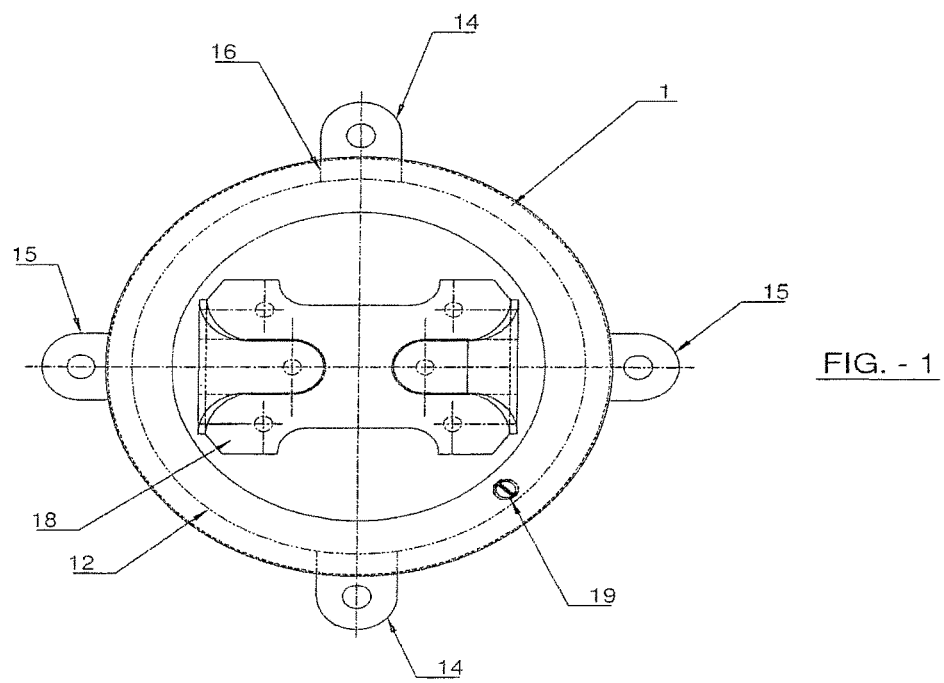
FIG. 1 is a top plan view of the hybrid plug in accordance with embodiment 1 of the invention.
Figure 2:
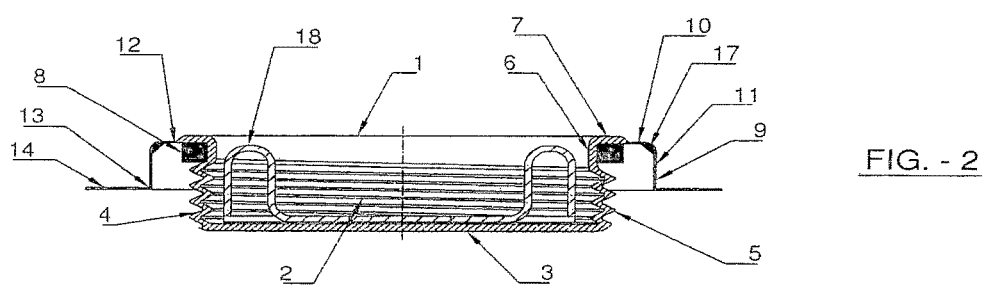
FIG. 2 is a vertical cross sectional view of the hybrid plug in accordance with embodiment 1 of the invention.

A hybrid plug, according to embodiment 1 of the invention is illustrated in FIGS. 1 and 2.

The hybrid plug 1 is stamped and metal formed from a single sheet of metal, preferably steel. As seen in FIG. 1, the hybrid plug 1 has a plug portion 2 and a capseal portion 9. The plug portion 2 has a circular base 3 surrounded by a cylindrical sidewall 4. The sidewall 4 has an external screw thread 5 terminating in a gasket seat 6. An annular collar 7 extends radially outwardly from the upper end of the gasket seat 6. A plug gasket 8 is disposed on the gasket seat 6 against the undersurface of the collar 7.

The capseal portion 9 comprises of an annular cap 10 extending radially from the rim of the collar 7 and an annular skirt 11 extending downwardly from the cap 10 and concentric to the sidewall 4.

The thickness of the capseal portion 9 is less than that of the plug portion 2. In the hybrid plug 1 the thickness of the plug portion 2 is 1.0 mm to 1.2 mm and the thickness of the capseal portion 9 is of 0.35 mm to 0.45 mm thickness.

An annular scoring 12 is provided at the point where the collar 7 meets the annular cap 10, resulting in substantial reduction of wall thickness at the site of the scoring 12. The scoring 12 allows the capseal portion 9 to be torn off for removal of the hybrid plug 1.

The capseal portion 9 is further provided with ears which extend outwardly from the skirt rim 13. Preferably two pairs of ears 14 and 15 are disposed at equal intervals on the skirt rim 13 in diametrically opposite pairs. The ears 14 are provided with scoring lines 16 running from both edges of each ear, from the skirt rim 13 to the annular scoring 12. Therefore, when force is applied to the ears 14, the capseal portion 9 tears along the scoring lines 16, thus enabling separation of the capseal portion 9 from the plug portion 2. The second pair of ears 15 is not provided with scoring lines 16.

A lining 17 is provided on the undersurface of the capseal portion 9 at the interface between the cap 10 and the skirt 11 to facilitate leak proof security.

One or more lugs 18 are disposed on, the base 2 of the hybrid plug 1 for screwing and unscrewing the plug.

A logo 19 can be stamped on any part of the capseal portion 9 to ensure that no tampering has been done with the product and the drum has reached end user with the original hybrid plug used at time of filling at the drum filler.

Figure 3:
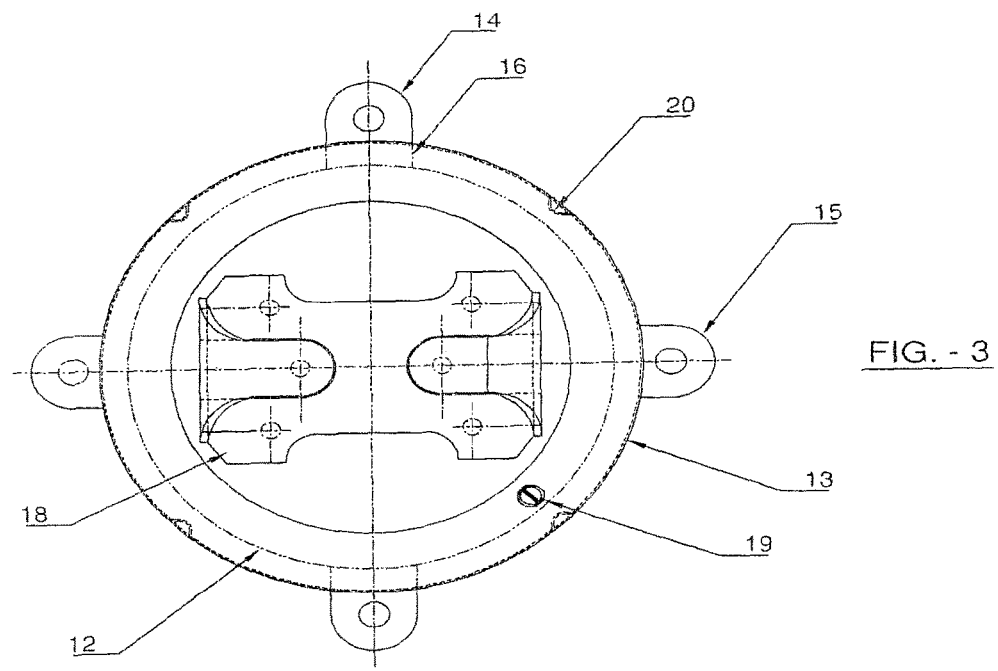
FIG. 3 is a top plan view of the hybrid plug in accordance with embodiment 2 of the invention.
Figure 4:
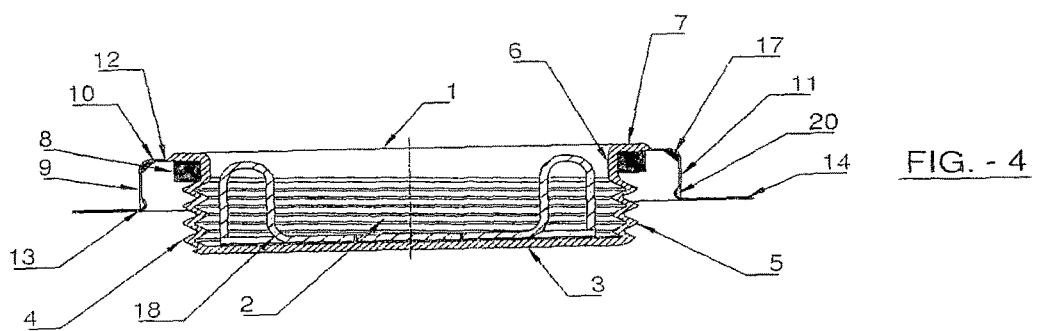
FIG. 4 is a vertical cross sectional view of the hybrid plug in accordance with embodiment 2 of the invention.

In embodiment 2 of the invention illustrated in FIGS. 3 and 4, the skirt 11 of the hybrid plug 1 is recessed at intervals to form dimples 20 in order to be able to hold the hybrid plug in place. Preferably, four dimples 20 are equally spaced at right angles to each other on the skirt 11.

Figure 5:
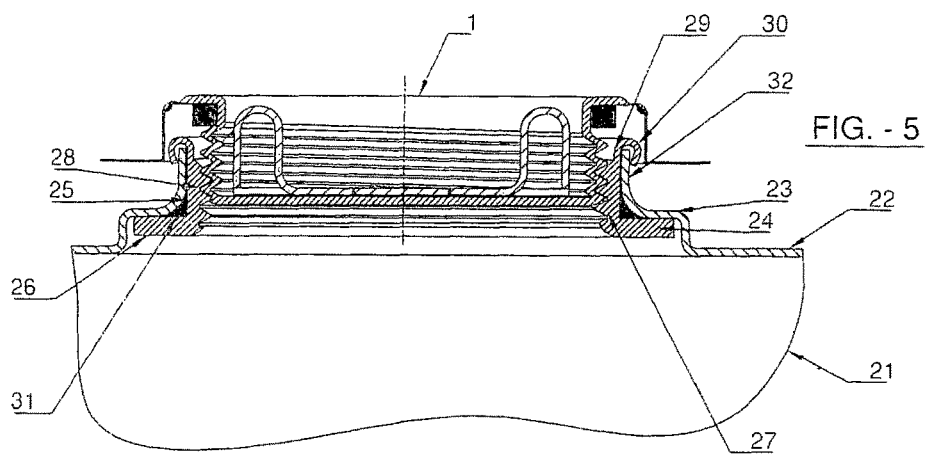
FIG. 5 illustrates the vertical cross sectional view of embodiment 1 of the hybrid plug in use in a drum in a partially screwed in position prior to drum painting.
Figure 6:
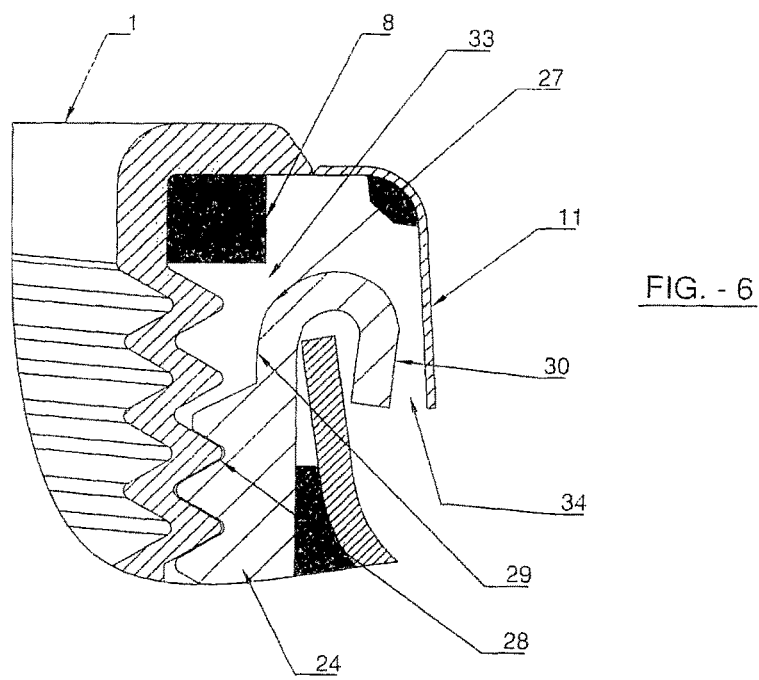
FIG. 6 is an enlarged partial view of FIG. 5.

FIGS. 5 and 6 illustrate embodiment 1 of the hybrid plug in use in a drum 21 in a partially screwed in position prior to drum painting. The hybrid plug 1 may be used to seal any drum-like container.

FIG. 5 illustrates a drum head 22 having an opening 23 conventionally installed with an internally threaded flange 24. Conventionally drum head openings 23 are of dimension 20 mm or 50 mm. The flange 24 has a cylindrical wall 25 extending upwardly from the flange base 26. The flange inner wall 27 has a threaded portion 28 extending upwardly from the flange base 26. The flange threads 28 extend into an unthreaded gasket sealing portion 29 which curves outwardly and downwardly to form a curled lip 30. The flange 24 is provided with a flange gasket 31 on its outer circumference at the angle formed by the flange wall 25 and the flange base 26.

The drum head opening 23 has a substantially vertical cylindrical neck 32 which extends within the curled lip 30 of the flange 24. When the flange 24 is crimped on the drum head 22, the flange gasket 31 gets compressed between the drum head 22 and the flange wall 25 providing effective sealing facility.

As seen in FIG. 6, prior to drum painting, the hybrid plug 1 is partially screwed into the flange threads 28. In this position, the curled lip 30 of flange 24 is covered by the skirt 11 thereby protecting the plug gasket 8 and the flange inner wall from contamination with paint during drum painting.

The hybrid plug 1 is screwed in such a manner that the plug gasket 8 does not make contact with the gasket sealing portion 29 of the flange inner wall 27. As a result a first aperture 33 is defined between the plug gasket 8 and the flange inner wall 27.

The capseal skirt 11 in the position illustrated in FIG. 6 does not make contact with the curled lip 30 of the flange 24 thus defining a second aperture 34 around the curled lip 30 of the flange 24.

During paint curing, the apertures 33 and 34 provides an outlet for expanded hot air from the drum thus protecting the plug gasket 8 and eliminating the need to remove the hybrid plug 1 from the flange 24 during the process of paint curing. Therefore, apertures 33 and 34 eliminate the need for a paint plug or even a conventional plug to be inserted into the flange opening before drum painting.

Figure 7:
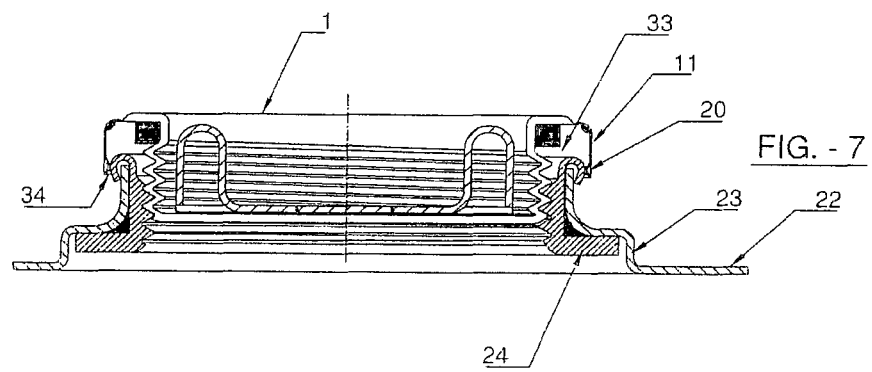
FIG. 7 illustrates the vertical cross sectional view of embodiment 2 of the hybrid plug installed in a drum head opening in a partially screwed in position before the drum head is assembled with the drum body.
Figure 8:
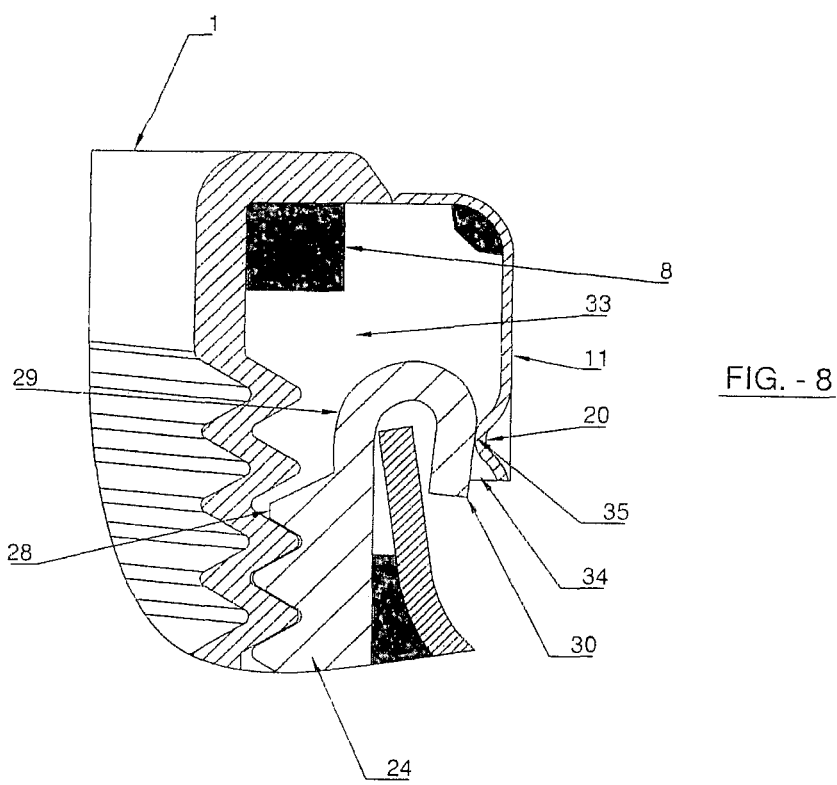
FIG. 8 is an enlarged partial view of FIG. 7.

FIGS. 7 and 8 illustrate embodiment 2 of the hybrid plug installed in a drum head opening 23 in a partially screwed in position before the drum head 22 is fabricated into the drum body.

The method of installation and use of the hybrid plug 1 of embodiment 2 is the same as for embodiment 1. However, the dimples 20 provided on the skirt 11 carry out a vital function which enables the hybrid plug 1 to be installed in an automated process after the automated insertion of the flange 24 into the drum head 22.

When the hybrid plug 1 is partially screwed into the flange threads 28 in the same manner as embodiment 1, the four dimples 20 on the capseal skirt 11 make contact with the curled lip 30 of the flange 24 at just four points 35. The remainder of the capseal skirt 11 does not make contact with the curled lip 30 of the flange 24 thus defining aperture 34 around the circumference of the curled lip 30 of the flange 24. The dimples 20 function to enable locking force to be applied to the flange 24 even without plug gasket 8 compression. This locking force is released when the hybrid plug 1 is torqued in and the plug gasket 8 makes contact with the flange gasket sealing portion 29.

The locking force generated by the dimples 20 allows the hybrid plug 1 to retain its position in the drum head 22 and prevents unscrewing or even screw forwarding of the hybrid plug 1 when drum head 22 is being assembled to the drum body.

Use of the hybrid plug of embodiment 2 facilitates the completely automated process of flange 24 insertion followed by automated hybrid plug insertion.

Leak testing of the drum 21 can be carried out after paint curing without removing the hybrid plug 1 from its partially screwed in position. Simple automated machinery may be used for sucking out air from the 20 mm drum head opening 23 while simultaneously injecting gases from the 50 mm opening 23 while the drum is traversing on a cooling conveyor after paint cure. Machine heads that suck or inject gases can have built-in torquers to immediately torque in the plugs after gas injection which can save some helium and nitrogen gas as compared to existing setups where torqueing is possible only as the next step after gas injection. The apertures 33 and 34 facilitate as an inlet for the gases into the drum 21 in the partially screwed in position of the hybrid plug 1. This obviates the need to remove the hybrid plug 1 for leak testing of the drum 21.

Figure 9:
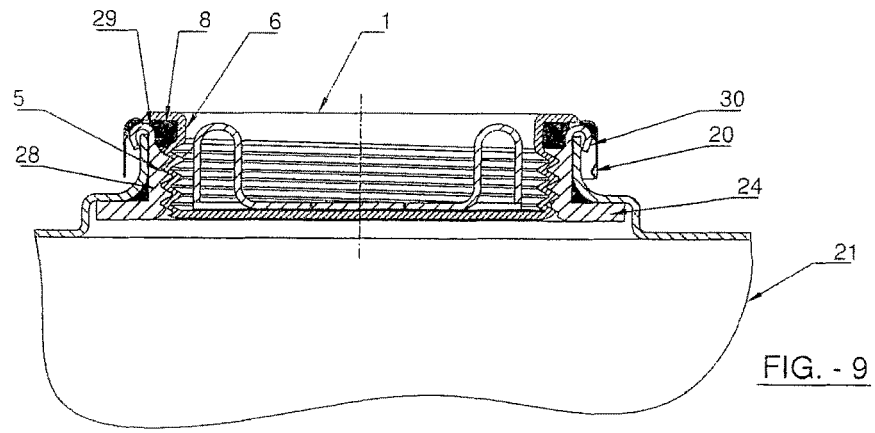
FIG. 9 depicts the vertical cross sectional view of the sealing relationship between the hybrid plug of either embodiment and flange in fully torqued condition.

FIG. 9 depicts the sealing relationship between the hybrid plug 1 of either embodiment and flange 24 in fully torqued condition.

After the injection of gases during leaking testing, the hybrid plug 1 is fully torqued by screwing it forward into the flange threads 28 so that the plug gasket 8 is tightly compressed between the plug gasket seat 6 and the gasket sealing portion 29 of the flange 24 thus securely sealing the drum 21 for leak testing. When the hybrid plug 1 is fully torqued in, the dimples 20 ride over the flange curled lip 30 thus releasing the locking force.

The hybrid plug 1 can be completely torqued in very easily in an automated machine because the hybrid plugs threads 5 and the flange threads 28 are already engaged thus avoiding thread finding in an automated process. This enables automated hybrid plug 1 insertion.

Figure 10:
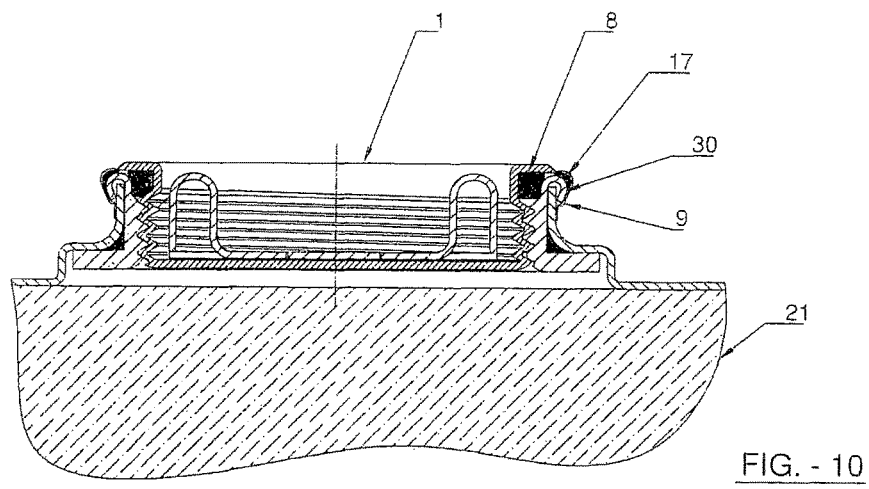
FIG. 10 depicts the vertical cross sectional view of the hybrid plug of either embodiment after drum filling, after the hybrid plug has been torqued and crimped.

FIG. 10 depicts the hybrid plug 1 of either embodiment post drum filling, after the hybrid plug has been torqued and crimped.

After leak testing, the drum 21 is sent for filling with a product. After the drum 21 has been filled, a single combination tool can be used to torque the hybrid plug 1 and then crimp the capseal portion 9. When the capseal portion 9 is crimped, the lining 17 wedges against the outer top surface of the flange curled lip 30 providing additional leak protection in case of plug gasket 8 failure and making the drum closure system tamperproof. The filled and sealed drum 21 is now ready for shipping to the end customer.

The use of a hybrid plug 1 avoids the use of a separate feed mechanism for capseals. Additionally, there is no separate requirement for the automated handling for a fragile component like a capseal and a single combination tool can be used to torque and crimp the hybrid plug.

Figure 11:
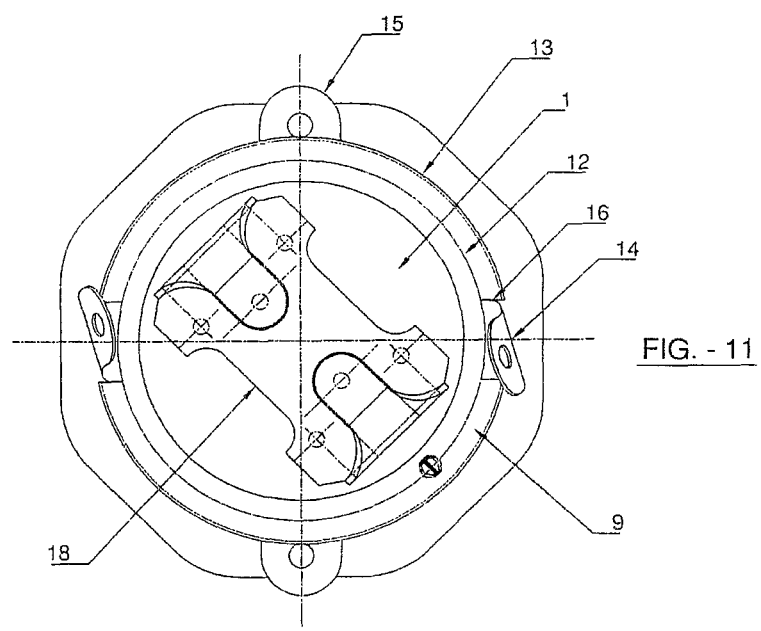
FIG. 11 depicts a top plan view of the method of removal of the hybrid plug of either embodiment.
Figure 12:
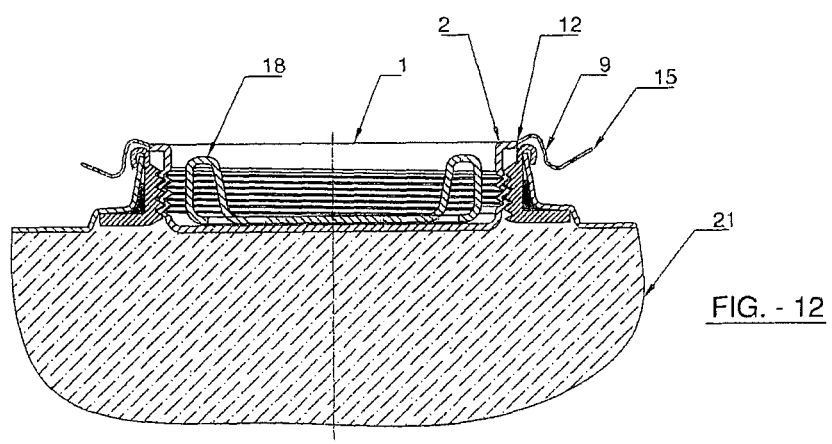
FIG. 12 depicts vertical cross sectional view of the method of removal of the hybrid plug.

FIGS. 11 and 12 depicts the method of removal of hybrid plug 1.

After the drum 21 has been filled it is sent to the end user. The process of hybrid plug 1 removal by the end user is initiated by gripping the first pair of ears 14 with any plier-like instrument and ripping the ears 14 along the scoring lines 16 up to the annular scoring 12 for partial removal of the capseal portion 9 of the hybrid plug 1. This leaves two parts of the capseal portion 9 remaining on either side of the scoring lines 16. The second pair of ears 15 is then gripped and lifted, to raise the crimped remaining capseal portion 9. The two remaining parts of the capseal portion 9 are then ripped off from the annular scoring 12 separating the capseal portion 9 completely from the plug portion 2.

The plug portion 2 remaining can then be unscrewed with the help of the lugs 18 to access the contents of the drum 21.

This invention is not necessarily restricted to the particular embodiments presented herein but the scope of the invention is to be defined by the terms of the following claims as given meaning by the preceding description.

I claim:

1. A hybrid plug formed from a single sheet of metal,
   a. the single sheet of metal comprising:
      i. a plug portion having a base, a cylindrical sidewall having an external threaded portion and a gasket seat, an annular collar extending radially outwardly from said cylindrical sidewall and an annular plug gasket disposed on the gasket seat against the undersurface of said collar;
      ii. a capseal portion having an annular cap extending radially from a rim of said collar and an annular skirt extending downwardly from said cap, concentric to said cylindrical sidewall, the thickness of the capseal portion being less than the thickness of the collar;
      iii. plurality of ears disposed along a rim of said skirt; and
      iv. scoring for easy tearing away of the capseal portion; and
   b. the hybrid plug further comprising one or more lugs fastened to the base to torque the plug portion.

2. The hybrid plug as claimed in claim 1 wherein an interface of said collar and capseal portion is indented to provide annular scoring to enable easy tearing away of the capseal portion from the plug portion.

3. The hybrid plug as claimed in claim 2 wherein a first pair of diametrically opposite ears is positioned on the rim of the skirt, scoring lines running from both edges of each ear, from the rim of the skirt to the annular scoring.

4. The hybrid plug as claimed in claim 3 wherein a second pair of diametrically opposite ears is equally spaced between the first pair.

5. The hybrid plug as claimed in claim 1 wherein a plurality of dimples is disposed on a lower end of the skirt to generate a locking force.

6. The hybrid plug as claimed in claim 5 wherein four dimples are equally spaced on said skirt.

7. The hybrid plug as claimed in claim 1 wherein an annular lining is provided on the undersurface of the capseal portion at an interface of the cap and the skirt.

8. A method of sealing a drum installed with a threaded flange having a curled lip comprising the steps of:
   i. inserting the hybrid plug of claim 1 into the flange threads before drum painting and partially screwing said hybrid plug forward so that the plug gasket does not make contact with a flange inner wall, thereby defining a first aperture between the plug gasket and the flange inner wall, the capseal skirt covering the flange inner wall and plug gasket to prevent contamination during drum painting, the hybrid plug positioned to define a second aperture between the capseal skirt and the curled lip of the flange, said apertures providing an inlet and outlet for air and gases;
   ii. screwing forward the hybrid plug completely into the flange threads when the drum has to be securely sealed, so that the plug gasket wedges against an inside of the flange curled lip;
   iii. sealing said drum after it has been filled by torquing and crimping the hybrid plug so that a lining wedges against the top of the flange curled lip;
   iv. gripping a first pair of ears and ripping said ears along scoring lines up to an annular scoring for partial removal of the capseal portion of the hybrid plug;
   v. gripping a second pair of ears and tearing the capseal portion off from the annular scoring to completely separate the capseal portion from the plug portion; and
   vi. unscrewing the plug portion with help of one or more lugs to access contents of the drum.

9. The method as claimed in claim 8 wherein the hybrid plug with dimples is used for insertion into the flange threads prior to assembly of the drum head with the drum body and drum painting, said step of inserting and partially screwing in the hybrid plug being automated and following the automated insertion of the flange into the drum head.

10. The method as claimed in claim 9 wherein when the hybrid plug is partially screwed into the flange threads, the dimples making contact with the curled lip of the flange at dimple contact points.

11. The method as claimed in claim 8 where the hybrid plug is torqued and crimped with a single combination tool.

\* \* \* \* \*